United States Patent [19]

Teach

[11] 3,903,130

[45] Sept. 2, 1975

[54] 1-TRIFLUORMETHYLPHENYL-3-DICYANOPHENYL UREA

[75] Inventor: Eugene G. Teach, El Cerrito, Calif.

[73] Assignee: Stauffer Chemical Company, Westport, Conn.

[22] Filed: May 3, 1974

[21] Appl. No.: 466,669

[52] U.S. Cl............. 260/465 D; 71/67; 260/465 E; 424/304
[51] Int. Cl.²...................................... C07C 121/54
[58] Field of Search................................ 260/465 D

[56] References Cited
UNITED STATES PATENTS 3,242,208  3/1966  Martin............................ 260/465 X
3,429,911  2/1969  Kirchner et al..................... 260/465

*Primary Examiner*—Elbert L. Roberts
*Assistant Examiner*—Dolph H. Torrence
*Attorney, Agent, or Firm*—Michael J. Bradley

[57] ABSTRACT

This invention relates to the utility of a cyanourea biocide having the formula

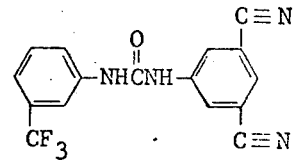

as a biocidal agent showing efficacy on bacteria, algae and fungi.

1 Claim, No Drawings

1-TRIFLUORMETHYLPHENYL-3-DICYANOPHENYL UREA

DETAILED DESCRIPTION OF THE INVENTION

This invention relates to the utility of a cyanourea biocide having the formula

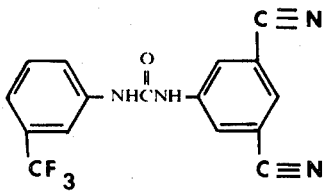

when used in a biocidally effective amount. Controlling the growth of bacteria, fungi and algae by applying the compound described herein can be accomplished by applying a biocidally effective amount to the environment in which the growth of bacteria, fungi and algae is encouraged. A specific example of such is the human mouth. The compounds may be applied to any environmental area which supports the growth and development of bacteria, fungi and algae. By "controlling" is meant the prevention of the growth of the bacteria, fungi and algae to be controlled.

The compound of this invention can be prepared by reaction of a suitable isocyanate with an aniline to give the desired product. Either portion of the urea may be added via the isocyanate, but in the case of the compound of the present invention, the m-trifluoromethyl phenyl isocyanate which is commercially available was reacted with 3,5-dicyano aniline which was prepared as shown in the following examples.

EXAMPLE 1

5-nitroisophthaloyl chloride 312 g (1.56 moles) of 5-nitroisophthalic acid was reacted with 350 g of thionyl chloride until a clear solution was obtained. Excess $SOCl_2$ was stripped off and the intermediate used as is.

EXAMPLE 2

5-nitroisophthalamide 83 g of 5-nitroisophthaloyl chloride prepared in Example 1 was added to 175 g of ammonium hydroxide cooled with ice. The product was filtered off, washed with water and dried. Yield was 70 g, mp 312°–314°C.

EXAMPLE 3

5-nitroisophthalonitrile 62.7 g of 5-nitroisophthalamide as prepared in Example 2 was heated with 120 g of $PCl_5$ and 1 g of Pyridine until evolution of HCl ceases and a clear solution resulted. The mixture was poured into water, filtered, washed with water and dried. Yield was 36.7 g, mp 197°–201°C.

EXAMPLE 4

3,5-dicyanoaniline
5-aminoisophthalonitrile 40 g of Iron powder, 3 ml of concentrated HCl, 125 ml of Ethyl alcohol and 100 ml of water were combined and heated to reflux. 48.6 g. of 5-nitroisophthalonitrile was added portion-wise to maintain reflux. When addition was complete 3 g of 50% NaOH was added and the mixture was filtered through a Dicalite pad. The iron oxide was extracted with acetone and the extract poured into water and combined with the product obtained by pouring the filtrate into water. The combined yield was 34.8 g of product, mp 181°–183°C.

The following examples demonstrate the method of preparation of the compound of this invention and efficacy of the compound upon utilization against bacteria, fungi and algae.

EXAMPLE 5

1-m-trifluoromethyl phenyl-3-(3',5'-dicyanophenyl) urea 3.6 g of 3',5'-dicyanoaniline was dissolved in 50 ml of acetone, 4.7 g of m-trifluoromethyl phenyl isocyanate was added with 5 drops of triethylamine catalyst. The mixture was heated at reflux for 1-2 hours, cooled and poured into water and the product filtered off. Yield was 6 g., m.p. 153°–157°C.

In the remainder of the examples the compound of Example 1 will be referred to as Compound I.

EXAMPLE 6

Biocide Testing Procedure

Tubes of sterilized nutrient and malt extract broth are prepared. Aliquots of the toxicant, dissolved in an appropriate solvent, are injected through the stopper, into the broth, to provide concentrations ranging from 50 ppm downward. The test organism is a fungus, Phoma herbarum. Three drops of a spore suspension of the fungus are injected into the tubes of malt broth. One week later the growth of the organism is observed and effectiveness of the chemical is recorded as the lowest concentration in ppm which provides 50% inhibition of growth as compared to untreated inoculated tube. The results of these tests are tabulated in Table I.

TABLE I

| | $\mu gm/ml$ |
|---|---|
| Compound I | >50 | greater than

EXAMPLE 7

In Vitro Agar Screening Tests

This test measures the bactericidal, fungicidal and algaecidal properties of a compound when in contact with growing bacteria, fungi or algae in an artifical medium. The test is conducted by adding 20 ml. portions of a suitable warm sterile agar solution into 20 × 100 mm. Petri dishes at levels of 1, 5, 10 and 50 ug/ml. and mixed with the warm mobile agar solution. The treated agar mixture is then allowed to come to room temperature and solidify. Cells of the chosen organism are streaked on the surface of the solidified agar and are then incubated for such lengths of time that untreated samples containing no toxicant show luxurious growth typical of the particular organism. This time varies from 24 hours to one week depending on the particular organism. The fungi are incubated at 30°C and the bacteria are incubated at 37°C. The algae are incubated at room temperature under artificial light. Nutrient agar is used as the medium in this test for the bacteria. Potato dextrose agar is used as the medium for the fungi with the exception of Trichophyton mentagrophytes for which Emmons agar is used. A modified Jack Meyers agar is used for the growth of the algae.

The extent of growth is noted at the end of the incubation period.

Representative organisms used in this test are as follows:

Bacteria
    Bacillus cereus
    Brevibacterium ammoniagenes
    Enterobacter aerogenes
    Escherichia coli
    Pseudomonas aeruginosa
    Pseudomonas fluorescens Fungi
    Asperigillus flavus
    Aspergillus fumigatus
    Aspergillus niger
    Aspergillus oryzae
    Aureobasidium pullulans
    Pencillium expansum
    Pencillium italicum
    Pencillium ochra-chloron
    Pencillium vermiculatum
    Rhizopus stolonifer
    Trichoderma sp.
    Trichophyton mentagrophytes Algae
    Chlorella pyrenoidosa
    Euglena gracilis
    Scenedesmus obliquus

TABLE II

In Vitro Agar Screening Tests
Minimum Inhibitory Concentration, µg/ml.

|  |  | Compound Number 1 |
|---|---|---|
| Bacteria |  |  |
|  | Bacillus cereus | 1 |
|  | Brevibacterium ammoniagenes | 5 |
|  | Enterobacter aerogenes | (5) |
|  | Escherichia coli | 50 |
|  | Pseudomonas aeruginosa | 50 |
|  | Pseudomonas fluorescens | 50 |
| Fungi |  |  |
|  | Asperigillus flavus | >50 |
|  | Aspergillus fumigatus | >50 |
|  | Aspergillus niger | >50 |
|  | Aspergillus oryzae | 50 |
|  | Aureobasidium pullulans | >50 |
|  | Pencillium expansum | >50 |
|  | Pencillium italicum | (10) |
|  | Pencillium ochra-chloron | >50 |
|  | Pencillium vermiculatum | >50 |
|  | Rhizopus stolonifer | >50 |
|  | Trichoderma sp. | 50 |
|  | Trichophyton mentagrophytes | (5) |
| Algae |  |  |
|  | Chlorella pyrenoidosa | 50 |
|  | Euglena gracilis | >50 |
|  | Scenedesmus obliquus | 10 |

( ) indicates partial control at this concentration
\> greater than

EXAMPLE 8

Sulfate Reducing Bacteria In Vitro Test

This test measures the bactericidal properties of a compound when in contact with a sulfate reducing bacteria, specifically Desulfovibrio desulfuricans. The test is conducted by dissolving the test compound in acetone to give an 0.5% solution. This toxicant is added to vials containing sterile Sulfate API broth with typtone under anaerobic conditions at such levels to give final toxicant concentrations of 1, 5, 10 and 50 ug/ml. of solution. An inoculant solution of 0.5 ml. of the growing organism, Desulfovibrio desulfuricans, is added to the vials followed by sufficient sterile distilled water to give a total of 10 ml. of solution in the vials. The vials are incubated at room temperature for 3 to 5 days until untreated controls show growth of the organism as indicated by the black color development in the vials.

The following is a summary of the minimum inhibitory concentration necessary to control the organism.

TABLE III

|  | µg/ml. Compound 1 |
|---|---|
| Desulfovibrio desulfuricans | (5) |

( ) indicates partial control at this concentration

EXAMPLE 9

Staphylococcus Aureus Use Dilution Test

This test measures the bacteriostatic effectiveness of a particular test compound against Staphylococcus aureus.

Tryptic Soy Broth is dispensed aseptically into sterile 13 × 100 mm. clear glass culture tubes. The first tube receives 3.6 ml. of medium and tubes 2 through 10 receive 2.0 ml. of medium. The test compound is dissolved in acetone to give 10 ml. of a solution of 0.10% of the test compound. Using a sterile syringe, 0.4 ml. of the test compound solution is placed in the first tube containing the 3.6 ml. of sterile broth and mixed thoroughly. This operation is continued through to the tenth tube. From the tenth tube, 2.0 ml. of solution is removed and discarded. Each tube is then innoculated with 0.1 ml. of a 24 hour culture of Staphylococcus aureus in Tryptic Soy Broth, and the mixture is mixed thoroughly using a Vortex mixer. A control is also set up to be sure that the inoculum is viable using a tube of sterile broth containing no added toxicant. The tubes are incubated for 24 hours at 37°C. The tubes are then examined to determine growth of the organism in the culture tubes. The minimum concentration in which no growth of the organism occurs is recorded. The following table gives the minimum inhibitory concentration necessary to control the organism:

TABLE IV

| Toxicant | Minimum Inhibitory Concentration Staphylococcus aureus, µg/ml. |
|---|---|
| Compound 1 | 1.56 |

The compound of this invention is generally embodied into a form suitable for convenient application. For example, the compound can be embodied into pesticidal compositions which are provided in the form of emulsions, suspensions, solution, dusts, and aerosol sprays. In general, such compositions will contain, in addition to the active compound, the adjuvants which are found normally in pesticide preparations. In these compositions, the active compound of this invention can be employed as the sole pesticide component or can be used in admixture with other compounds having similar utility. The pesticide compositions of this invention can contain, as adjuvants, organic solvents such as sesame oil, xylene range solvents, heavy petroleum, etc; water; emulsifying agents; surface active agents; talc; pyrophyllite; diatomite; gypsum; clays; propellants, such as dichlorodifluoromethane etc. If desired, however, the active compound can be applied directly to feedstuffs, seeds, etc., upon which pests feed. In connection with the activity of the presently disclosed pesticidal compound, it should be fully understood that it is not necessary that it be active as such. The purposes of this invention will be fully served if the compound is rendered active by external influences, such as light or by some physiological action which occurs when the compound is ingested into the body of the pest.

The precise manner in which the pesticidal composition of this invention are used in any particular instance will be readily apparent to a person skilled in the art. Generally, the active pesticide compound will be embodied in the form of a liquid composition; for example, an emulsion, suspension or aerosol spray. While the concentration of the active pesticide in the present pesticidal compositions can vary within rather wide limits, ordinarily the pesticide compound will comprise not more than about 15.0% by weight of the pesticidal composition. Preferably, however, the pesticidal compositions of this invention will be in the form of solutions or suspensions containing about 0.1 to 1.0% by weight of the active pesticide compound.

What is claimed is:

1. A biocidally active compound having the formula

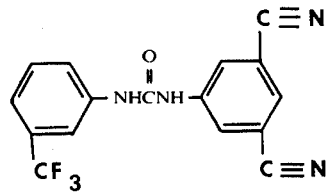

* * * * *